US008732530B2

(12) United States Patent
Ng

(10) Patent No.: US 8,732,530 B2
(45) Date of Patent: May 20, 2014

(54) SYSTEM AND METHOD FOR SELF-DIAGNOSIS AND ERROR REPORTING

(75) Inventor: Kim Fatt Ng, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 308 days.

(21) Appl. No.: 13/250,484

(22) Filed: Sep. 30, 2011

(65) Prior Publication Data

US 2013/0086429 A1 Apr. 4, 2013

(51) Int. Cl.
*G06F 11/00* (2006.01)

(52) U.S. Cl.
USPC ........................................................ 714/38.1

(58) Field of Classification Search
USPC ........................................................ 714/38.1
See application file for complete search history.

(56) References Cited

U.S. PATENT DOCUMENTS

| 6,126,330 | A | * | 10/2000 | Knight | 717/127 |
| 6,470,388 | B1 | * | 10/2002 | Niemi et al. | 709/224 |
| 6,473,707 | B1 | * | 10/2002 | Grey | 702/123 |
| 2005/0193264 | A1 | * | 9/2005 | Khan et al. | 714/38 |
| 2008/0052271 | A1 | * | 2/2008 | Lam | 707/3 |
| 2011/0320884 | A1 | * | 12/2011 | Thilagar et al. | 714/48 |

* cited by examiner

*Primary Examiner* — Yair Leibovich
(74) *Attorney, Agent, or Firm* — Westerman, Hattori, Daniels & Adrian, LLP

(57) ABSTRACT

A system for self-diagnosing and error reporting of a software application in a computer system having a plurality of software applications and background processes, the system comprising a diagnosis module configured to collect and monitor usage data of resources of the computer system, execution status of the software applications and background processes of the computer system, and software application error conditions, adjust logging level of log files according to the execution status of the software applications and background processes of the computer system and the software application error conditions, and generate diagnosis advisory based on the usage data of the resources of the computer system and the software error conditions, and a reporting module configured to collect and report the usage data of the resources of the computer system, the log files and the generated diagnosis advisory automatically to a user.

18 Claims, 2 Drawing Sheets

SYSTEM AND METHOD FOR SELF-DIAGNOSIS AND ERROR REPORTING

TECHNICAL FIELD

The present invention relates generally to self-diagnosis and error reporting for software, more specifically, but not limited to, monitoring and detecting unexpected software errors and runtime conditions, and collecting information for further analysis.

BACKGROUND

Software has becoming an indispensable tool in many aspects of today's technological world, especially in the field of Industrial Automation, where control systems and other software are used to reduce the need for human work in the production of goods and services Although software is usually rigorously tested by the software developers before the official release and ideally free from defects or errors of any kinds, in reality, software errors may still occur after the software is deployed to the customer's site due to events or runtime conditions which were not expected by the software developers during the development phase. Any unexpected errors causing the software to deviate from the normal operational behavior or to stop functioning can be referred to as software errors.

To analyze the cause of the software error and prevent the recurrence of the same error, the software developer needs to collect a lot of information, such as the computing environment, possible events that may lead to the software error and the effects of the software error. However, collecting such information may not be as easy one thinks due to a number of factors. First, the software developer usually does not have access to the customer environment due to various reasons such as geographical, infrastructure or access policy restrictions, and has to request the customer to provide the necessary information. Second, the customer may not have the knowledge about how to collect or where to look for the necessary information or files, and such request may be viewed as a trouble to the customer, adding to the customer's frustration and dissatisfaction. Third, because of the reactive approach described in the following paragraphs, the collected information for analyzing the error may not be sufficient to identify the root cause of the error: the logging level of the software system is by default set to very low to minimize the performance and resource impact on the system, and thus the vital information which can help identify the software defect is not recorded; an extended period of time, from the time the software error occurred to the time the log files are collected, may have passed, and the log files which contain the vital information may have been deleted or overwritten; the software error is totally not anticipated by the software developer, and as a result, no relevant or useful information is logged at all; the external factors or conditions, which caused the software error to occur, have disappeared or recovered. All these factors impair the software developer's ability to effectively grasp the situation, making it impossible for the software developer to respond to the problem in the shortest time possible.

FIG. 1 shows a typical process flow 100 of how an unexpected software error is handled by the customer 140 and the software developer 160 respectively, illustrating the reactive approach used in the industry.

When the customer encounters an unexpected software error 104 during normal operation 102, he reports it to the software developer 106 and expects the software developer to resolve the error by restoring the software to its normal operating state as well as preventing the error from recurring. In order for the software developer to fix the software error effectively, the software developer often needs to know the phenomenon of the software error accurately. Sometimes, the software developer may also need to reconstruct and reproduce the customer's environment in order to investigate and identify the root causes of the software error. When the software developer receives the complaint from the customer 108, the error descriptions and the computing environment descriptions may not be comprehensive and detailed enough. As a result, the software developer usually has to collect additional information 110, such as system configuration and software log files, either by accessing the customer's computer directly, or by requesting the customer to collect or provide such information 112. After investigating and analyzing the currently available information 114, if the information is sufficient for the software developer to identify the root cause of the software error 106, the software developer proceeds to fix the software error 124 and deploy it 126. However, in most cases, the software developer may find that the information is insufficient for various reasons discussed above. Thus, in order to obtain the vital information, the software developer needs to adjust and increase the logging level 118 and then requests the customer to resume operation of the software system 120, with the hope that the software error would occur again so that the new vital information needed would be collected for identifying the cause of the software error. However, it may be possible that the software error will not occur again, which means the error is not reproducible, and the root cause of the software error may no longer be identified and the chance for fixing a software defect may be lost.

Besides the problems of collecting vital information, adjusting the logging level may also cause problems to the customer as it involves the step of changing the software configuration on the customer's computer. Sometimes, it may even be necessary to modify the software modules to inject more logging statements to capture vital information which was not captured previously. If the computer is not accessible by the software developer, the customer will be requested to make the changes either by modifying a file or registry settings directly, or by applying a software patch, resulting in a risk of misconfiguration or upsetting the customer's system, as well as customer's dissatisfaction.

Further, the software is usually operated on a computer system having many software applications which are provided by different software vendors or developers and the status and behavior of these software applications are not monitored generally from the overall computer system's aspect. The fact that these software applications are running on the same physical hardware and operating platform means that they are in fact consuming the same pool of system resources, such as CPU, memory, storage space, object handles, etc. Thus, poorly designed software which consumes system resources uncontrollably may eventually cause resource starvation on the system and subsequently lead to unexpected software error in other software running on the same computer. In this case, the root cause of the software error cannot be identified easily as it lies in some other software that is not monitored.

In addition, because the usage of the system resource is not monitored from the overall system's aspect, it is not possible to provide warning or diagnosis advisory to the customer for taking preventive actions, and the customer will only recognize the problem after the software error has occurred.

SUMMARY OF THE INVENTION

According to a first exemplary aspect, there is provided a system for self-diagnosing and error reporting of a software application in a computer system having a plurality of software applications and background processes, the system comprising a diagnosis module configured to collect and monitor usage data of resources of the computer system, execution status of the software applications and background processes of the computer system, and software application error conditions, adjust logging level of log files according to the execution status of the software applications and background processes of the computer system and the software application error conditions, and generate diagnosis advisory based on the usage data of the resources of the computer system and the software error conditions, and a reporting module configured to collect and report the usage data of the resources of the computer system, the log files and the generated diagnosis advisory automatically to a user.

The system may further comprise a repository for storing the usage data of the resources of the computer system, a management Application Programming Interface configured to register the software applications and background processes of the computer system whose execution status needs to be collected and monitored, and a logging Application Programming Interface between the diagnosis module and the software applications. The logging Application Programming Interface is configured to output log files and report software error conditions.

The diagnosis module of the system may be further configured to analyze the usage data of the resources of the computer system to forecast the exhaustion of the resources and manage the system resources used by the system itself.

The diagnosis advisory preferably comprises the cause of resource exhaustion and actions to be taken by the user.

The reporting module may be further configured to provide a user graphical interface for interaction with the user and allow the user to make and edit screenshots, attach files and data, and set a desirable logging level to override the logging level set by the diagnosis module.

The reporting module may be further configured to collect related diagnosis information and package it together with the usage data of the resources of the computer system, the log files and the generated diagnosis advisory automatically to a user. The related diagnosis information may comprise captured screenshots, attached files or data, a complete file list, computer hardware specifications, operating system version and service pack level, Windows Event logs, a list of installed software packages and a list of running processes and services.

According to a second exemplary aspect, there is provided a method for self-diagnosing and error reporting of a software application in a computer system having a plurality of software applications and background processes, the method comprising collecting and monitoring usage data of resources of the computer system, execution status of the software applications and background processes of the computer system, and software application error conditions, adjusting logging level of log files according to the execution status of the software applications and background processes of the computer system and the software application error conditions, generating diagnosis advisory based on the usage data of the resources of the computer system and the software error conditions, and collecting and reporting the usage data of the resources of the computer system, the log files and the generated diagnosis advisory automatically to a user.

The method may further comprise registering the software applications and background processes of the computer system whose execution status needs to be collected and monitored, analyzing the usage data of the resources of the computer system to forecast the exhaustion of the resources, providing a user graphical interface for interaction with the user and allowing the user to set a desirable logging level to override the adjusted logging level.

The method may further comprise collecting related diagnosis information and package it together with the usage data of the resources of the computer system, the log files and the generated diagnosis advisory automatically to a user, and the related diagnosis information may comprise captured screenshots, attached files or data, a complete file list, computer hardware specifications, operating system version and service pack level, Windows Event logs, a list of installed software packages and a list of running processes and services.

BRIEF DESCRIPTION OF DRAWINGS

The present invention is illustrated by way of examples and is not limited by the accompanying figures, in which.

DETAILED DESCRIPTION OF THE PREFERRED EMBODIMENTS

The detailed description set forth below in connection with the appended drawings is intended as a description of the presently preferred embodiments of the invention, and is not intended to represent the only form in which the present invention may be practiced. It is to be understood that the same or equivalent functions may be accomplished by different embodiments that are intended to be encompassed within the scope of the invention.

Figure 1:
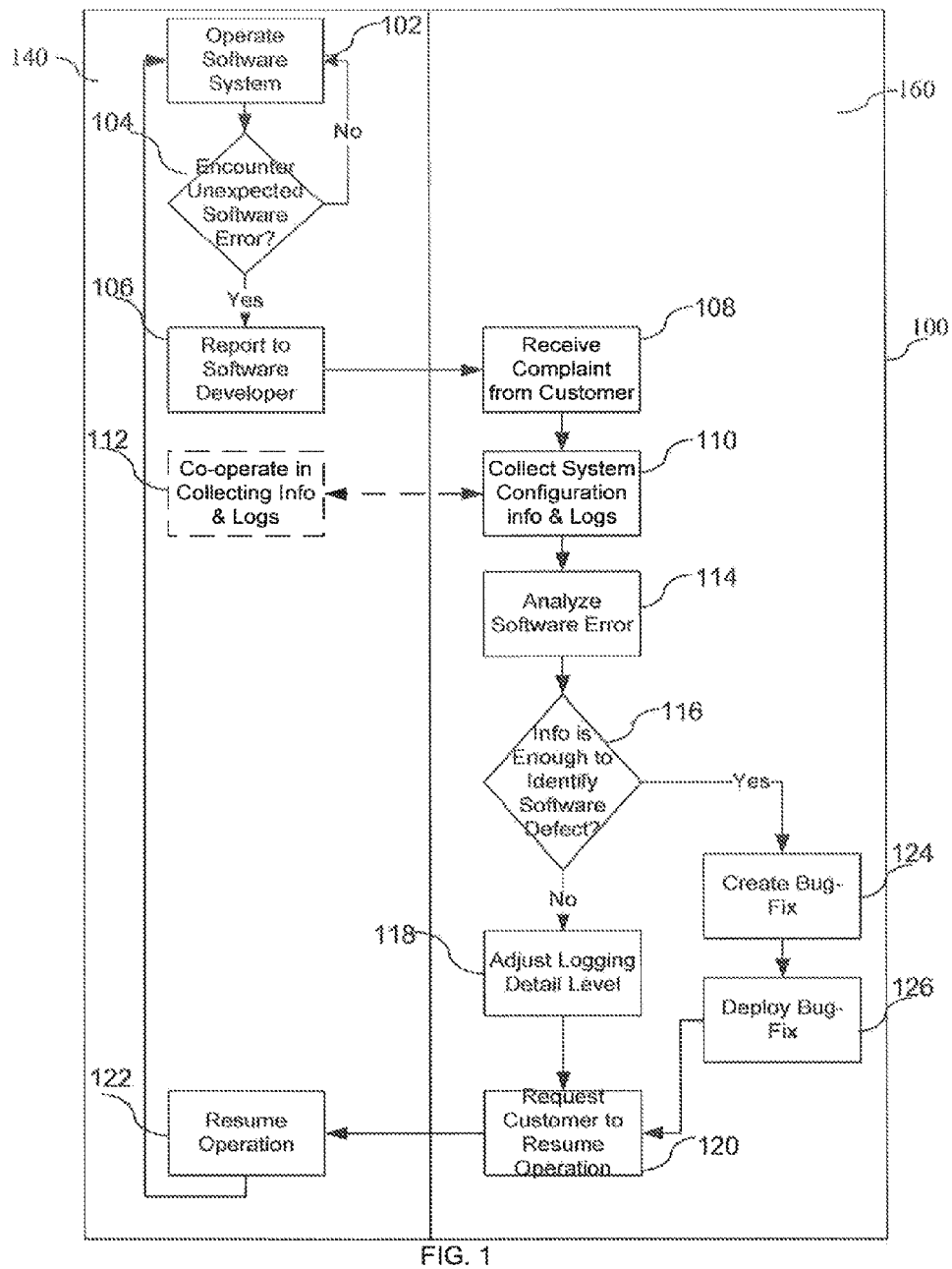
FIG. 1 illustrates a process flow of the software error reporting and defect fixing.
Figure 2:
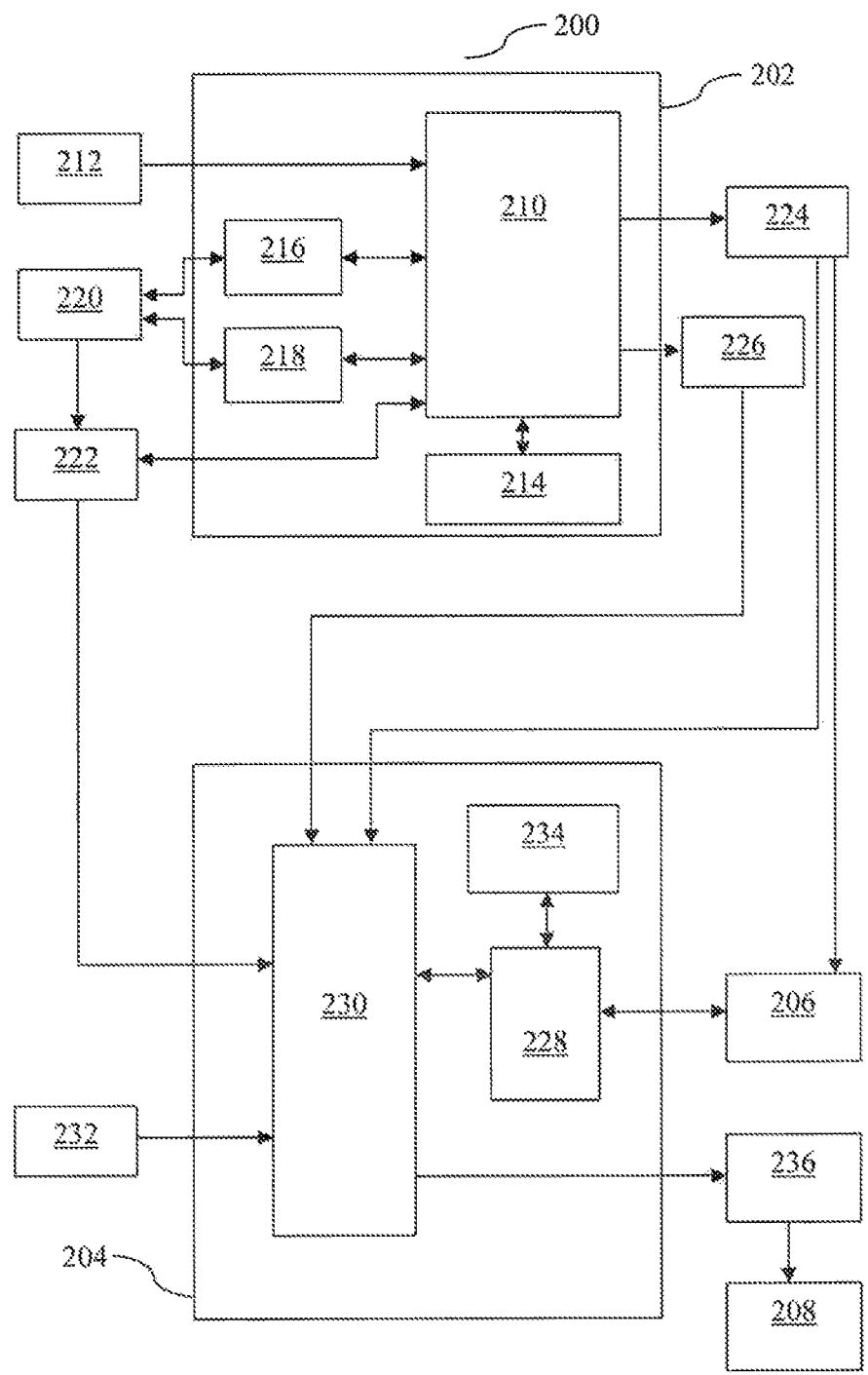
FIG. 2 shows a block diagram of an exemplary system according to one embodiment of the present invention.

As shown in FIG. 2, the exemplary system 200 has two sub systems: self-diagnosis system 202 for performing monitoring and diagnosing activities and error reporting system 204 for interaction with a customer or user 206 and outputting error reports to a software developer 208.

The self-diagnosis system 202 runs as a background service independently from any other services and applications in a computer system. It has a diagnosis module 210 which performs the main functions of the self-diagnosis system 202.

The diagnosis module 210 periodically captures and monitors the usage statistics of critical computer system resources 212, such as CPU, memory, hard disk spaces, object handles count, threads count and etc. The usage data is collected at the overall system level as well as at each process level. The diagnosis module 210 also performs trend analysis on the usage statistics to predict the possibilities of resource exhaustion and when it might occur, and generates daily, weekly, monthly, quarterly and annual forecasts based on the analysis.

The diagnosis module 210 is also configured to issues warnings or diagnosis advisories 224 to the customer 206 about the cause of resource exhaustion and appropriate actions to be taken. Such warnings or diagnosis advisories 224 are issued based on the generated forecasts as well as predefined diagnostic algorithms and diagnostic advisory knowledge base formulated and pre-defined by experienced engineers and stored in the self-diagnosis system 202. For example, if it determines that the resource exhaustion is due to genuine data growth, it would advise the customer to increase the system capacity. On the other hand, if it determines that the resource exhaustion is due to software defects such as resource leaks, then it would advise the customer 206 to report the phenomenon to the software developer 208 for further analysis.

Optionally, the diagnostic algorithms and diagnosis advisory knowledge base is extensible, capable of being added or updated dynamically.

A repository 214 stores the usage data of the computer system resources as Resource Usage History for trend analysis performed by the diagnosis module 210 and for possible troubleshooting in the future.

A management API (Application Programming Interface) 216 is provided to register software services and applications or background processes 220 at runtime for process status monitoring and management. Thus, the diagnosis module 210, through the management API 216, obtains and monitors the execution status of the registered software services and applications or background processes 220. With such information, the diagnosis module 210 is optionally configured to automatically restart the software services and applications or background processes 220 in the event that they are terminated unexpectedly or stopped responding in order to maintain software service availability.

A logging API (Application Programming interface) 218, an interface between the diagnosis module 210 and the software services and applications 220, is also provided to output tracing or debugging logs for the software services and applications 220 in a consistent and standardized manner. It also provides the avenue for software services and applications 220 to report software errors or abnormal software conditions to the diagnosis module 210.

In a preferred embodiment, the diagnosis module 210 manages the logging level of log files and adjusts the logging level automatically for software services and applications 220 which use the logging API 216. By default, the logging level will be set to low under a normal operating condition in order to minimize impact on performance and system resources. When the diagnosis module 210 detects any abnormal software conditions, such as when any registered software service and application or background process is terminated unexpectedly or stopped responding or when any software service and application reports a severe software error condition through the logging API 218, it then sets the logging level for the erroneous software application to high automatically. If the diagnosis module 210 no longer detects any abnormal software conditions over a period of predefined timeframe after a software application is updated, it then determines that the software error has been resolved and will adjust the logging level back to low automatically.

The diagnosis module 210 also generates diagnosis advisory 224 containing notification messages to inform the customer 206 about the detected abnormal software conditions and advices for the customer 206 to use the error reporting system 204 to report the error to the software developer 208.

Optionally, the diagnosis module 210 regulates and manages the system resources which are used by the self-diagnosis system 202, including CPU, memory and storage space, maintaining a minimal footprint and impact on the computer system. For example, it manages the storage capacity of log files 222 and the collected usage data of the computer system resources which is stored in the repository 214, and performs functions periodically, such as aggregating, compacting, compressing, archiving, overwriting, or deleting old data, to make sure that the self-diagnosis system 202 will not cause any system problems.

The error reporting system 204 provides a reporting module 230 which guides the customer 206 in providing the necessary information related to the software error via a graphical user interface (GUI) application 228. The reporting module 230 allows the customer to write textual descriptions as well as make and attach screenshots and additional supporting files easily. It provides an electronic form for the customer 206 to comment and describe about the software error or problem, including the descriptions about the steps to reproduce the problem. It also provides a function for the customer 206 to choose to take screenshots as full-screen, window or selected areas with a click of a predefined button on the GUI or by pressing a hot-key. The screenshots are stored automatically and the customer can review, annotate by adding comments or highlighting, or delete the screenshots easily. It also provides the option for the customer to attach additional files or data related to the software error.

Upon finalization by the customer 206, the reporting module 230 automatically assembles all diagnosis information available, including the log files 222, the resource usage reports 226 from the repository 214, diagnosis advisories 224, and other related information 232 to generates a Error Report Package 236 which can be sent to software developer 208 for further analysis and investigation either using email or courier. The automatic collection of diagnosis information by the reporting module 230 frees the customer from providing such information manually and eliminates human error. Other related information 232 may include, but not be limited to, captured screenshots, attached files or data, a complete file list having at least file names, time stamps and file versions, computer hardware specifications, operating system version and service pack level, Windows Event logs, a list of installed software packages and a list of running processes and services. The above list of other related information 232 may be configured to be extended to additional files or data which may be collected and included in the Error Report Package as default selection.

Thus, the Error Report Package 234 contains the clear description about the software error together with all the necessary information for the software developer to reconstruct and reproduce the customer's environment accurately and quickly, and to identify the root cause of the software error.

In an alternative embodiment, instead of generating the Error Report Package 234, the error reporting system 204 may also provide the customer with the option to submit the error report directly to the software developer 208 via interne.

The error reporting system 234 may provide a logging level module 234 for the customer to set the desirable logging level for software services and application, which overrides the logging level set automatically by the diagnosis module 210 of the self-diagnosis system 202.

It should be appreciated that the invention has been described by way of example only and that various modifications in design and/or detail may be made without departing from the spirit and scope of this invention.

The invention claimed is:

1. A system for self-diagnosing and error reporting of a software application in a computer system having a plurality of software applications and background processes, comprising:
a diagnosis module executing in the computer system and configuring the computer system to:
collect and monitor usage data, stored in a repository of the computer system, of resources of the computer system, execution status of the software applications and background processes of the computer system, and software application error conditions;

adjust a logging level of log files stored in the repository according to the execution status of the software applications and background processes of the computer system and the software application error conditions; and generate a diagnosis advisory based on the usage data of the resources of the computer system and the software application error conditions; and a reporting module executing in the computer system and configuring the computer system to:

collect related diagnosis information from the repository, the related diagnosis information including a complete file list, computer hardware specifications, an operating system version and service pack level, Windows Event logs, a list of installed software packages, and a list of running processes and services;

package the related diagnosis information, the usage data of resources of the computer system, the log files and the diagnosis advisory into an error report package; and report, using a user graphical interface, the error report package automatically to a user.

2. The system of claim 1, wherein the logging level is stored in the repository of the computer system.

3. The system of claim 1, further comprising a management Application Programming interface configured to register the software applications and background processes of the computer system whose execution status needs to be collected and monitored.

4. The system of claim 1, further comprising a logging Application Programming interface between the diagnosis module and the software applications, the logging Application Programming Interface configured to output the log files and report the software application error conditions.

5. The system of claim 1, wherein the diagnosis module is further configured to analyze the usage data of the resources of the computer system to forecast exhaustion of the resources.

6. The system of claim 5, wherein the diagnosis advisory comprises a cause of the exhaustion of the resources and actions to be taken by the user.

7. The system of claim 1, wherein the diagnosis module is further configured to manage the resources of the computer system of claim 1.

8. The system of claim 1, wherein the user graphical interface provides interaction with the user.

9. The system of claim 1, wherein the reporting module is further configured to allow the user to make and edit screenshots and to attach files and data.

10. The system of claim 1, wherein the reporting module is further configured to allow the user to set a desirable logging level to override the logging level set by the diagnosis module.

11. The system of claim 1, wherein the related diagnosis information further includes captured screenshots and attached files or data.

12. A method for self-diagnosing and error reporting of a software application in a computer system having a plurality of software applications and background processes, comprising:

collecting and monitoring usage data of resources of the computer system, execution status of the software applications and background processes of the computer system, and software application error conditions;

adjusting logging level of log files according to the execution status of the software applications and background processes of the computer system and the software application error conditions;

generating diagnosis advisory based on the usage data of the resources of the computer system and the software application error conditions;

collecting related diagnosis information including a complete file list, computer hardware specifications, an operating system version and service pack level, Windows Event logs, a list of installed software packages and a list of running processes and services;

packaging the related diagnosis information, the usage data of resources of the computer system, the log files and the generated diagnosis advisory into an error report package; and reporting the error report package automatically to a user.

13. The method of claim 12, further comprising registering the software applications and background processes of the computer system whose execution status needs to be collected and monitored.

14. The method of claim 12, further comprising analyzing the usage data of the resources of the computer system to forecast exhaustion of the resources.

15. The method of claim 14, wherein the diagnosis advisory comprises a cause of the exhaustion of the resources and actions to be taken by the user.

16. The method of claim 12, further comprising providing a user graphical interface for interaction with the user.

17. The method of claim 12, further comprising allowing the user to set a desirable logging level to override the adjusted logging level.

18. The method of claim 12, wherein the related diagnosis information further includes captured screenshots and attached files or data.

* * * * *